ESTABLISHING INTRACONCENTRATOR CONNECTIONS IN A REMOTE LINE CONCENTRATOR SYSTEM

Filed Dec. 16, 1963 4 Sheets-Sheet 1

INVENTOR
L. C. J. ROSCOE
BY
S E Hollander
ATTORNEY 3,308,243

ESTABLISHING INTRACONCENTRATOR CONNECTIONS IN A REMOTE LINE CONCENTRATOR SYSTEM

Lawrence C. J. Roscoe, North Brunswick, N.J., assignor to Bell Telephone Laboratories, Incorporated, New York, N.Y., a corporation of New York Filed Dec. 16, 1963, Ser. No. 330,958
10 Claims. (Cl. 179—18)

This invention relates to remote telephone line concentrator systems and more particularly to concentrator systems including intraconcentrator switching facilities.

Recently, line concentration, i.e., the remote termination of a larger number of telephone lines at a switching unit in the field and the extension of the lines over a relatively smaller number of trunks to the central office, has been receiving increased attention. In part, the advantages of line concentration inhere in the premise that it is no longer necessary to extend each substation line directly over an individual path to the central office. Instead, service of a quality comparable to that of private lines may be afforded to customers whose substation lines are terminated at a remote concentrator.

In response to a supervisory signal or calling indication from a remote line, the central office extends a path over a selected idle trunk to the service requesting line by controlling the remote concentrator switching unit to couple the line to the selected trunk. Thereafter, the common equipment in the central office is coupled to the trunk extending to the remote concentrator unit and the subscriber is provided with dial tone. Subsequently, in response to dialed signals indicative of the called substation directory number, the central office proceeds in a conventional manner to extend a path to the called substation.

If, however, the called substation is coupled to the same remote switching network as that of the calling substation, the path to the called substation is nevertheless extended in a manner substantially similar to that described for the extension of a path to calling substations in general. Firstly, where there is a high community of interest between customers connected to the same remote concentrator switching network, it is possible for a substantial number of intraconcentrator calls to exist. Notwithstanding, under these conditions, it is necessary, in certain prior arrangements, in each instance to extend a path from the remote concentrator at which the calling substation is terminated over a trunk to the central office and to extend a similar but independent path from the central office over another trunk to the termination of the called substation at the concentrator unit. Moreover, in the central office, the connection between the calling and called substations is extended over common equipment, for example, an intraoffice trunk.

Since the calling and called substations may be in close proximity to each other, for example, in adjoining houses or offices, the tortuous path to and from the central office which involves the utilization of two trunks appears inefficient.

The situation is presented in even sharper relief when it is appreciated that the trunks to and from the concentrator are not individual to the lines but instead are available only on a shared basis. Thus, in a concentrator which utilizes ten trunks to service fifty lines, for example, a single intraconcentrator call by requiring two separate trunks pre-empts a full 20 percent of the available trunk capacity.

Certain prior art arrangements in this area which have provided for the local interconnection of calling and called substation lines at the remote unit have required intricate and complex circuitry for the supervision of the call after the interconnection is made. Since, by definition, lines in a concentrator system are remotely terminated at the concentrator switching unit and do not extend to the office, the problem is presented of supervising the line condition if it is made over a local interconnection exclusive of any channels to the office.

It is therefore an object of this invention to provide an intraconcentrator switching arrangement for interconnecting remote concentrator lines at the remote switching unit by releasing one of the two trunks utilized in initially establishing the connection through the office and by maintaining supervision of both lines over the single remaining trunk.

Certain other prior art arrangements in this area have necessitated the use of complex control equipment or complex sequences of control functions in order to effectuate the local interconnection of the remote concentrator lines at the remote switching unit. Thus, some arrangements require the use of special intraconcentrator links for completing paths between the calling and called substations.

Other arrangements require the use of separate control sequences to release the trunks to the central office and to effectuate the local interconnection at the concentrator.

It is therefore another object of this invention to provide for the release of one of two trunks initially utilized in establishing an intraconcentrator call and to connect both substations to the remaining single trunk in response to a single control pulse which simultaneously releases the desired trunk and reconnects both substations to the remaining trunk.

These and other objects and features of the invention are achieved in a specific illustrative embodiment in which a remote concentrator includes at least two switching stages. Each of the stages comprises differentially excited ferreeds of the type described in Patent No. 3,037,085 of T. N. Lowry of May 29, 1962. As described in the Lowry patent, a single ferreed crosspoint may be operated to couple a particular line to a selected trunk by pulsing all of the control windings of the ferreed. Those ferreeds which have only a portion of their control windings energized remain released, and, if previously operated, are specifically released.

In a typical intraconcentrator operation, a substation which is connected to a horizontal of a first stage switch matrix is connected to a central office over a selected trunk by the energization of a particular crosspoint in the first stage in response to control signals delivered from the office in a manner described, for example, in Patent No. 3,022,382 of J. C. Ewin of February 20, 1962. The extension of the subscriber's substation to the office over the operated ferreed crosspoint and a selected idle trunk results in the energization at the office of common equipment which is adapted to transmit dial tone to the calling substation and to receive the dial pulses indicative of the called directory number. Assuming that the called number is that of a substation in the same concentrator, the office proceeds in a conventional manner to establish a connection through the office and thereafter extends the connection further over another independent idle trunk to the remote concentrator whereupon a second crosspoint in the first stage unique to the called substation is activated (in a manner similar to that described above for the first crosspoint) as well as a crosspoint in the second stage to couple the called line to the second idle trunk. At this time a complete path extends between the calling and called substation.

However, since the call is an intraconcentrator call, it is detected as such by means not shown herein as not essential to an understanding of the present invention but shown in detail, for example, in an application of R. G. Fisher, Serial No. 248,517, filed December 31, 1962 now Patent No. 3,250,859. Thereafter, the central office transmits information indicative of an order to release one of the two trunks utilized in the call and to reconnect both substations to a single idle trunk through the second stage switching network. Under these conditions, a single pulse transmitted to a pulse control circuit of the second stage network simultaneously releases the connection to one of the trunks and reconnects both subscribers to the same trunk.

Thereafter, the single remaining trunk is utilized via a supervisory circuit responsive to both lines to transmit supervisory indications indicative of hangup (disconnect) to the central office for action thereat, including the release of the single remaining trunk if necessary.

These and other objects and features of the invention may be more readily comprehended from an examination of the following specification, appended claims and attached drawing in which:

FIG. 1 shows a simplified diagram disclosure of the first and second stage switching networks and a supervisory circuit utilized in an illustrative embodiment of the present invention;

FIGS. 2–4 indicate the details of the first and second stage switching network matrices;

FIG. 5 shows the details of a crosspoint in the network matrices of FIGS. 2 and 3; and FIG. 6 shows the disposition of FIGS. 2–4 in order to disclose the invention.

GENERAL DESCRIPTION OF OPERATION

As shown in FIG. 1, the present arrangement includes a group of first stage or line link frames 100–103 and a second stage or trunk link frame 104. Sixteen customer lines of which only two, namely, substation 00 and substation 01, are shown are terminated on the horizontals of the line link frames 100–103. Half of the verticals of the line link frames are extended to the second stage network 104 and the remaining half of the verticals are coupled to supervisory circuits and thereafter over trunks extending to the central office 105. Thus, conductor 107 extends from the vertical of line link frame 100 to supervisory circuit 401 and thereafter over trunk 108 to the central office. Similarly, conductor 106 extends from a vertical of the line link frame 100 to a supervisory circuit 109 and over trunk 110 to the central office.

It is understood that although a single conductor is shown in FIG. 1 on the verticals of the line link frames and the trunk link frame, it is representative of the conventional tip and ring conductors T and R as designated in FIG. 1 and shown within the detail of the supervisory circuit 401.

Moreover, it is understood that the remaining supervisory circuits 109, 111–116 are the same as supervisory circuit 401 shown in detail, and that each of the supervisory circuits 112, 111, etc. extends over a corresponding trunk 117, 118, etc., to the central office 105.

The individual crosspoints of each of the line link and trunk link frames may illustratively be of the differential ferreed type disclosed, for example, in the above-referred-to patent of T. N. Lowry and shown in FIG. 5. The control winding circuitry for the ferreed crosspoints is omitted from FIG. 1 for clarity but the horizontal and vertical windings of each crosspoint are shown in FIGS. 2 and 3. The paths shown in FIG. 1 through the matrices of the line link frames and the trunk link frame are speech paths exclusively in FIG. 1 whereas both the speech and control paths are shown in FIGS. 2 and 3.

To illustrate the operation on a typical call, it will be assumed that substation 00 goes off hook to initiate an originating call. Scanning facilities, not shown herein but explained for example in Patent 3,033,937 of W. C. Jones of May 8, 1962, detect the service request condition and transmit information indicative thereof to the central office. The latter in turn selects an idle available trunk for connection to the remote substation line and transmits appropriate information to register means, also not shown as not essential to an understanding of the present invention.

For an explanation of the operation of selected crosspoints to effect a connection between the originating substation line 00 and the selected idle trunk assumed to be trunk 108, reference may be made to the above-referred-to patents of W. C. Jones and T. H. Lowry, as well as an application of D. A. Kerr and G. F. Swetnam, Jr., Serial No. 330,731, filed December 16, 1963.

As explained herein in detail, crosspoints 119 are operated to extend a path from substation 00, conductor loop T, R, crosspoints 119, conductor 107 to the tip and ring conductors T and R of supervisory circuit 401. Thereafter, the path may be further traced for the tip conductor over capacitor 406 to the tip conductor of trunk 108, and for the ring conductor over capacitor 407 to the ring conductor of trunk 108 and to the central office 105.

Subsequently, the equipment at the office is responsive in a conventional manner to transmit dial tone to the subscriber at the calling substation over the path traced above. The customer at substation 00 proceeds to dial the digits of the called number. When all of the digits are received, a separate idle trunk is selected in the manner described in the above-referred-to patent of W. C. Jones and also in the patent of J. C. Ewin, 3,002,382 of February 20, 1962, and information is transmitted to the remote concentrator unit to effect a connection to the called substation. If it is assumed that the called substation is substation 01, the central office may, for example, select a path over trunk 110, supervisory circuit 109, crosspoint 313 and conductor 125 to line link frame 100. Thereupon, the crosspoints 122 and 313 are energized in a manner similar to that described above for crosspoint 119. At this time a complete path is extended between substation 00 and substation 01 through central office 105 and thunks 108 and 110.

Additional equipment in the central office, not shown herein as not essential to an understanding of the present invention but shown in detail for example in the above-referred-to application R. G. Fisher, is utilized to detect the existence of the intraconcentrator call whereupon the central office proceeds to release the trunk to the called substation and instead to connect both substations to trunk 108.

It is an aspect of this invention that the release of the connection to trunk 110 and the reconnection of substation 01 through network 104 is prformed concurrently. As explained in detail hereinafter, crosspoint 313 is released and crosspoint 123 is simultaneously operated to sever the connection between substation 01 and trunk 110 and instead to reconnect substation 01 through the trunk switch 104 and the supervisory circuit 401 to substation 00. Thus, a path may be traced from substation 00, crosspoint contacts 119 (previously operated), conductor 107 to supervisory circuit 401. In addition, a path may be traced from supervisory circuit 401, over conductor 124, crosspoint contacts 123, conductor 125, crosspoints 122 to substation 01. At this time substations 00 and 01 are coupled through supervisory circuit 401. The latter upon the operation of cut-through relay 4CT in response to signals transmitted from the central office, but shown symbolically as being operated by manual switch 126, completes a path for the connection of supervisory relays 4S1 and 4S2 to the above-described paths.

Relay 4S1 operates over a path from ground, lower winding of relay 4S1, coil 127, contacts of relay 4CT to the tip conductor over the path previously traced including the switchhook contacts of substation 00 (not shown), ring conductor, contacts of relay 4CT, coil 128, upper winding of relay 4S1 to negative battery. Relay 4S2 operates over a similar path including the switchhook contacts (not shown) of substation 01.

Relays 4S1 and 4S2 provide disconnect supervision for the call since if subscriber 00, for example, hangs up, relay 4S1 will release thereupon supplying a ground to the ring conductor of trunk 108 over the contacts of relay 4CT. If substation 01 disconnects, a similar path may be traced over the contacts of relay 4S2 and relay 4CT to the tip conductor of trunk 108. Suitable well-known responsive apparatus at the central office detects the transmission of the ground indication to effectuate the release of trunk 108 and the release of relay 4CT.

When relay 4CT is released, as shown symbolically by switch 126, the trunk 108 may again be used for battery charging purposes to charge battery 129 over a path including ground, inductance 130, diode 131, contacts of relay 4CT, ring conductor of trunk 108, charging equipment (not shown) in the office 105, tip conductor of trunk 108, contacts of relay 4CT, diode 132, inductance 133 to negative battery 129.

Thus it is seen that substation 01 may be reconnected from its previous independent connection to the central office over trunk 110 to a local connection including crosspoints 123 of trunk link 104 by simultaneously releasing crosspoint 313 and operating crosspoint 123.

DESCRIPTION OF MAJOR COMPONENTS

FIGS. 2–4 show the details of the first stage ferreed network and the second stage ferreed network including the control paths which are omitted in FIG. 1 for clarity. Thus, each crosspoint in the first stage network of FIG. 2 and the second stage network of FIG. 3 includes contacts within an envelope (not shown) of a differentially excited ferreed shown in FIG. 5 and explained comprehensively in the above-referred-to Lowry patent.

Referring to the ferreed network 100, it is seen that crosspoint 119 includes contacts 201 and 202 in the tip and ring conductors of the speech path through the network. Each ferreed includes horizontal windings, such as windings 203 and 204 of crosspoint 119 and vertical windings, such as windings 205 and 206 of crosspoint 119. It will be noted that each of the horizontal windings in a particular row are connected in series between the horizontal control circuit 207 and a vertical bus 208.

Similarly, each of the vertical windings in a column in network 100 are connected in series between the vertical control circuit 209 and a horizontal bus 210. A pulse source 211 supplies operating pulses for the ferreed crosspoints of network 100 as well as second stage network 104.

It will be noted in FIG. 2 that only first stage network 100 is shown in detail and that the remaining networks are omitted except for network 103 which is shown in outline form.

The speech paths from each of the verticals of the primary or first stage switch 100 extend either to the second stage switch 104 or to a supervisory circuit in FIG. 4. Thus, vertical conductors 106 of network 100 extend over cable 212 to supervisory circuit 109 of FIG. 4 and the circuit thereafter extends over trunk 110 to the central office.

Similarly, conductors 107 of switch 100 extend over cable 212 to supervisory circuit 401 of FIG. 4. Moreover, conductors 125 of network 100 extend over cable 213 to the corresponding vertical path of secondary network 104. In a corresponding manner, the remaining vertical speech paths of the primary switches 100–103 are coupled to the secondary switch 104, as shown in FIGS. 1 and 3, although the latter includes only a partial showing in order to preserve clarity.

The second stage network 104 also includes an individual horizontal control circuit 301 and a vertical control circuit 302 in order to select specific crosspoints within the matrix in the manner described in detail in the above-referred-to Lowry patent.

FIG. 5 which shows a typical crosspoint in both networks includes (to use the reference designations of FIG. 2) horizontal windings 203 and 204 and vertical windings 205 and 206. Although the crosspoints in FIGS. 2 and 3 are shown in the well-known "mirror" symbology, it is understood that they incorporate crosspoints of the type shown schematically in FIG. 5. The "differential" excitation derives from the manner of winding the cores in which windings 203 and 205 have fewer turns than windings 204 and 206. Under these conditions, as explained in detail in the above-referred-to patent of T. N. Lowry, a current through windings 203 and 204, but not through windings 205 and 206, will not operate the contacts 501 and 502. Moreover, such a current will effectuate the release of the contacts if previously operated. Similarly, a current which travels only through windings 203 and 204 will not operate the contacts. However, current flow through both the horizontal and vertical windings (all the windings) results in a flux flow in both legs 503 and 504 in the same direction to effect the operation of contacts 501 and 502.

Thus, it is seen that the primary networks are coupled to the second stage network 104 and to the supervisory circuits 112, 109, 401, etc., in a manner whereby half of the vertical paths (e.g., conductors 106) of the primary switches are connected to the second stage switch 104 and the remainder to the supervisory circuits (e.g., circuit 401).

The horizontal control circuits and vertical control circuits, although not shown in detail herein, provide circuitry for connecting the pulse source 211 to the appropriate horizontal and vertical conductive control paths through the windings of the ferreeds in order to select or release particular crosspoints. A suitable type of control circuit is shown, for example, in the above-referred-to application of D. A. Kerr and G. F. Swetnam, Jr. Illustratively, the control circuits may include "tree" type selecting circuits as disclosed in the above-referred-to Kerr et al. application. In order to select a particular crosspoint in the first stage network (e.g., crosspoint 119) and a particular crosspoint in the second stage network (e.g., crosspoint 123), horizontal control circuit 207 and vertical control circuit 209 are activated to apply a pulse over horizontal conductor 214 and vertical conductor 215. Similarly, horizontal control circuit 301 applies a signal over horizontal conductor 303 and vertical control circuit 302 applies a pulse over vertical conductor 305.

The particular paths for the operation of crosspoint 119 and of crosspoint 123, will be traced in the following detailed description.

DETAILED DESCRIPTION OF OPERATION

Figure 1:
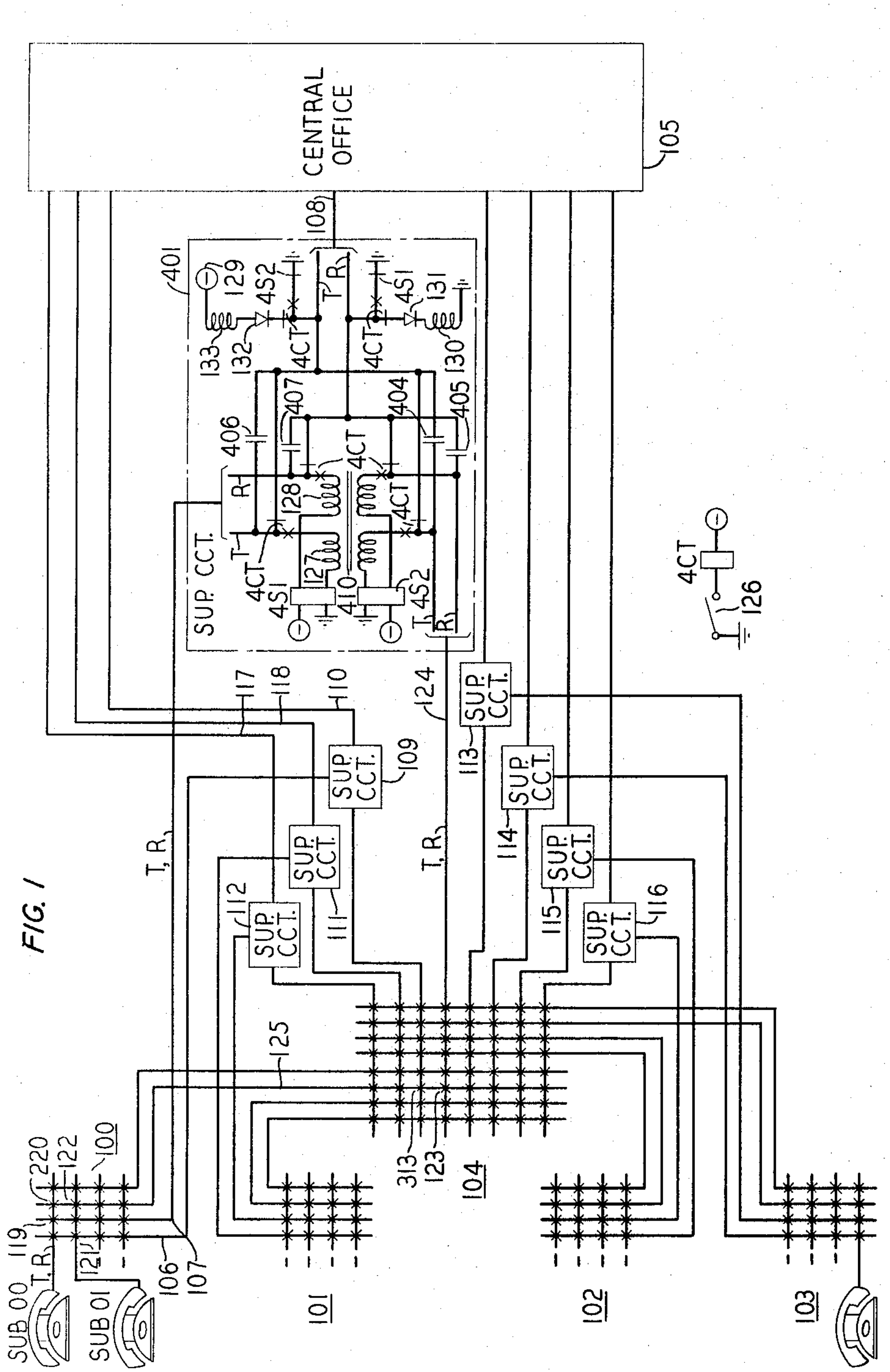

It will be assumed for purposes of illustration that the customer at substation 00 is initating a call to the customer at substation 01. As indicated in the general description, the off-hook condition at substation 00 may be detected by scanning facilities disclosed in Patent 3,033,937 of W. C. Jones of May 8, 1962, and in Patent 3,022,382 of J. C. Ewin of February 20, 1962. Information indicative of the supervisory condition of the line is transmitted to the central office which in turn, as disclosed in the Jones and Ewin patents, selects a trunk extending to the calling remote substation. The central office transmits signals, also as indicated in the Jones and Ewin disclosure and in the Kerr et al. application, indicative of the appropriate crosspoints to be operated to complete a connection between the calling substation 00 and the central office.

It will be assumed that trunk 108 is the selected trunk for extension of the call to the office.

To couple trunk 108 to substation 00, it is necessary to energize ferreed 119 of primary stage 100. Under these conditions, a pulse is applied to conductor 214 from pulse source 211 through horizontal control circuit 207. For clarity, the pulse is shown as being applied to conductor 214 over manual switch 218, although it is understood that suitable control facilities of the type disclosed, for example, in the Kerr et al. application above referred to, may be utilized. The pulse signal is further extended over conductor 214, horizontal windings of ferreeds 219, 119, 220, 221, vertical bus 208, horizontal bus 210, vertical windings 205 and 206 of ferreed 119, vertical windings of ferreeds 222, 223, 224, conductor 215, manual switch 225 to pulse source 211 thereby completing the current path. Since ferreed 119 is the only ferreed in switch 100 which is energized over both horizontal and vertical windings, the contacts 201 and 202 of ferreed 119 are operated. All other ferreeds are unaffected. Moreover, those ferreeds in the horizontal row and vertical column in which ferreed 119 appears are released if previously operated.

Figure 4:
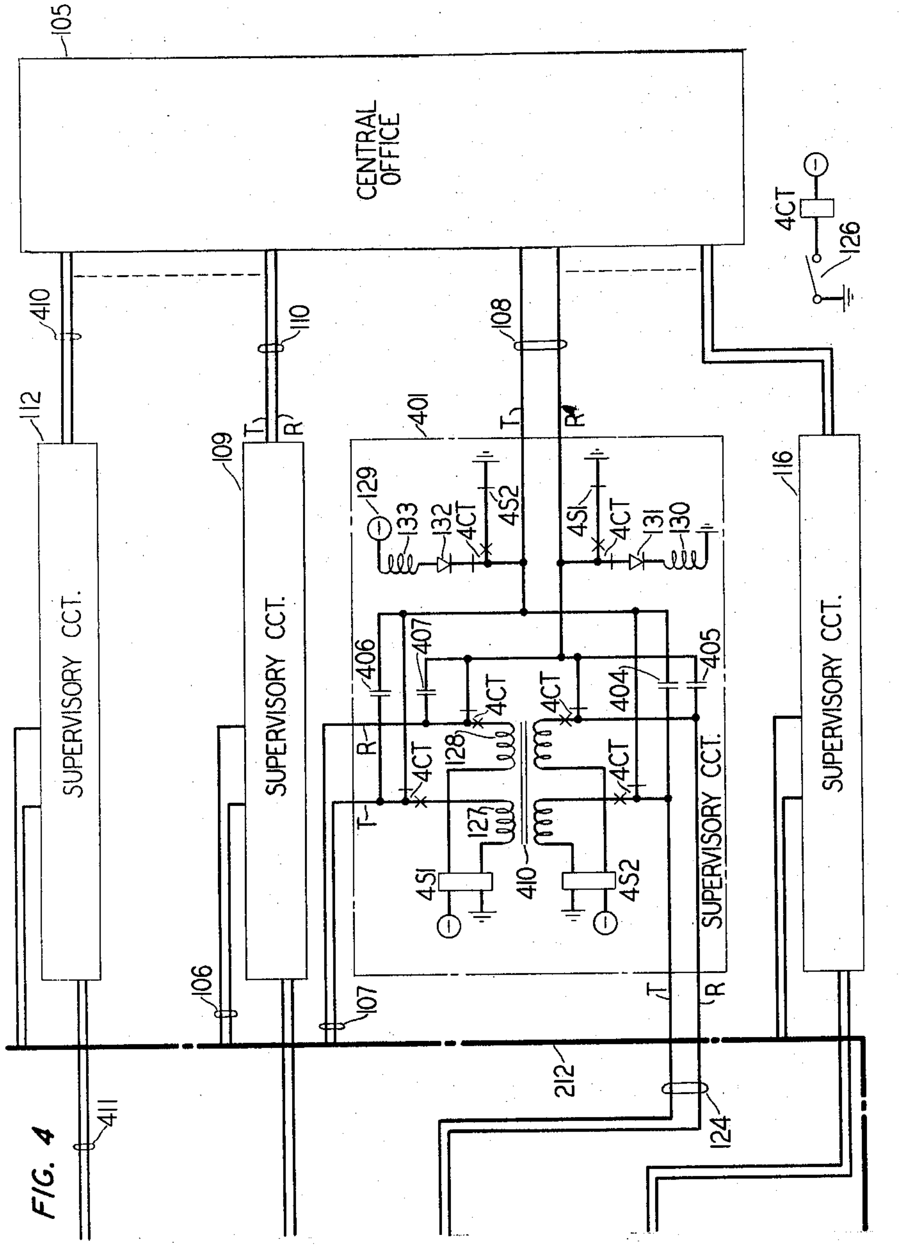

At this time a path may be traced from substation 00, loop conductors 226, contacts 201 and 202 of ferreed 119, conductor 107, cable 212 to FIG. 4, conductors 107, normally closed contacts of relay 4CT to the tip and ring conductors of trunk 108 to the central office. At this time facilities at the office responsive to the extension of the connection to calling substation 00 are utilized to supply dial tone to the calling station by connecting a register in the conventional manner as described in the Jones and Ewin patents above referred to. When dial tone is received by the calling subscriber, he may proceed to dial the digits of the called number.

In response to the reception of the dialed digits comprising the called party's directory number, the central office proceeds to select a trunk for extension of the connection to the called party. In this case, since the called substation is assumed to be substation 01, the central office may, in the manner described above for the originating call, proceed to select trunk 110 to effect a connection to the called party. In order to accomplish this result, crosspoints 122 in the primary stage network 100 and 313 in network 104 must be operated. Under these conditions a pulse from pulse source 211 is directed by horizontal control circuit 207 to conductor 227, horizontal windings of ferreeds 121, 222, 122, 229, vertical bus 208, horizontal bus 210, vertical windings of ferredes 220, 122, 235, 236, conductor 235, switch 225 and back to the pulse source 11 to complete the current path. Moreover, horizontal control circuit 301 and vertical control circuit 302 are arranged to energize ferreed 313 in network 104 over a path including manual switch 306, conductor 318, horizontal windings of ferreeds 319, 320, 313, 321, vertical bus 310, horizontal bus 311, vertical windings of ferreeds 312, 313, 123, 314, conductor 305 to manual switch 315. As described above, the pulse from pulse source 211 traverses a path through the horizontal and vertical windings of ferreed 313, to operate the contacts thereof. At this time ferreeds 122 and 313 are operated to extend a path from substation 01, loop 233, crosspoint contacts of ferreed 122, conductors 125, cable 213 to FIG. 3, and over the contacts of ferreed 313, supervisory circuit 109 and trunk 110 to the central office.

Thus far, the call has proceeded in a manner wherein a first trunk (108) has been extended to the calling party and a separate trunk (110) has been extended to the called party. At this time the central office proceeds to ascertain if the calling and called substations are connected to the same concentrator, i.e., if an intraconcentrator call exists. The manner in which the identification of an intraconcentrator call is made is not essential to an understanding of the present invention and may be found, for example, in the above-referred-to application of R. G. Fisher.

Since in the assumed illustration, substations 00 and 01 are indeed coupled to the same concentrator on primary switch 100, the central office transmits information to the remote unit to release the connection between one of the lines and its respective trunk and instead to interconnect the calling and called lines over second stage switch 104 and supervisory circuit 401.

Figure 3:
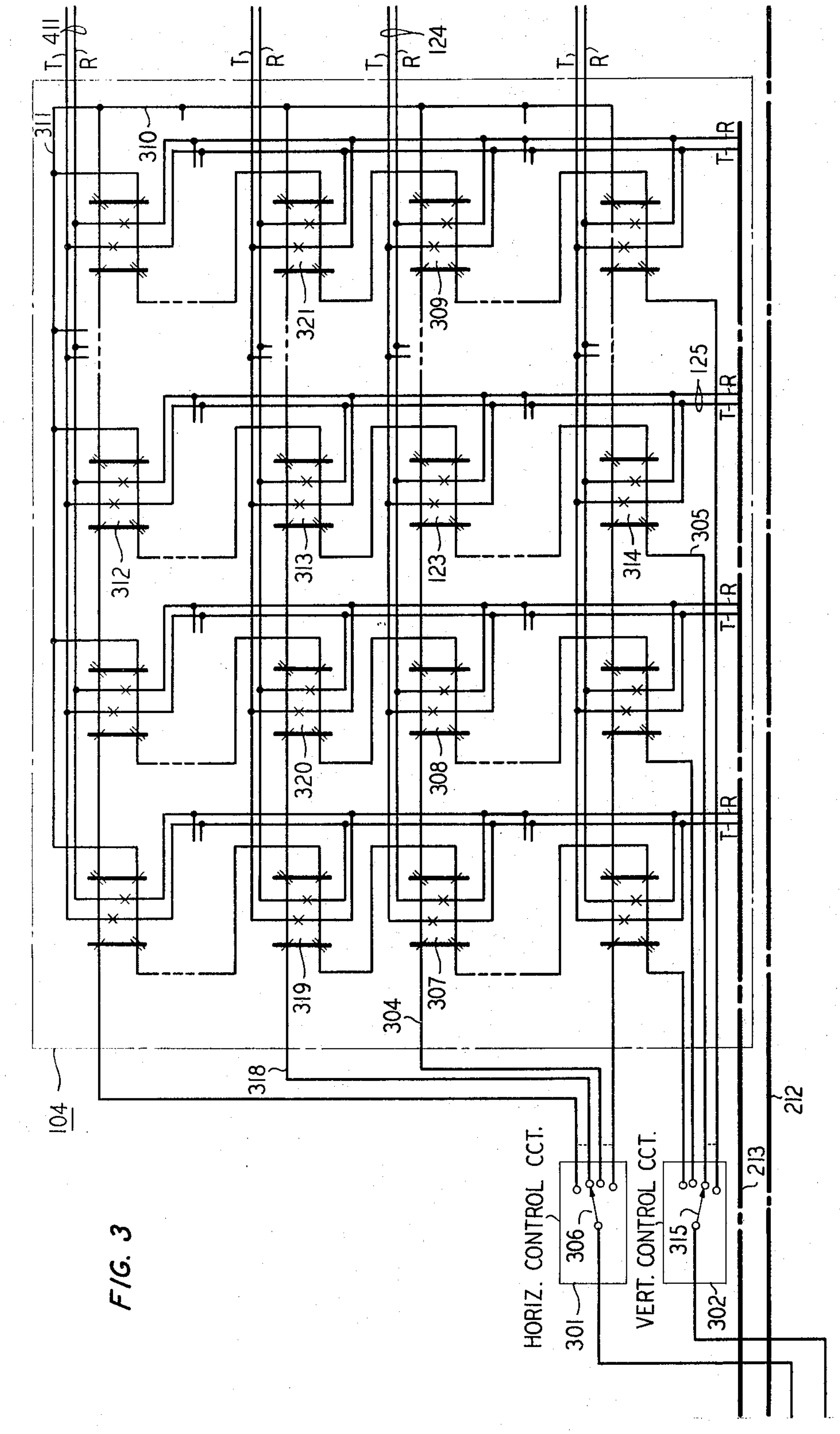

Thus, in response to data transmitted from the central office indicative of an order to release trunk 110 and instead to reconnect the called party at substation 01 to trunk 108, a path is completed in FIG. 3 to interconnect the calling and called substations. Horizontal control circuit 301 extends a connection to conductor 304 over manual switch 306 which may be traced over the horizontal windings of ferreeds 307, 308, 123, 309, vertical bus 310, horizontal bus 311 and the vertical windings of ferreeds 312, 313 (previously operated), 123, 314 to conductor 305 and manual switch 315 of vertical control circuit 302. It will be noted that although only four ferreeds have been traced in the horizontal and vertical paths of second stage switch 104 that four ferreeds are omitted in each path but shown in detail in FIG. 1.

Figure 2:
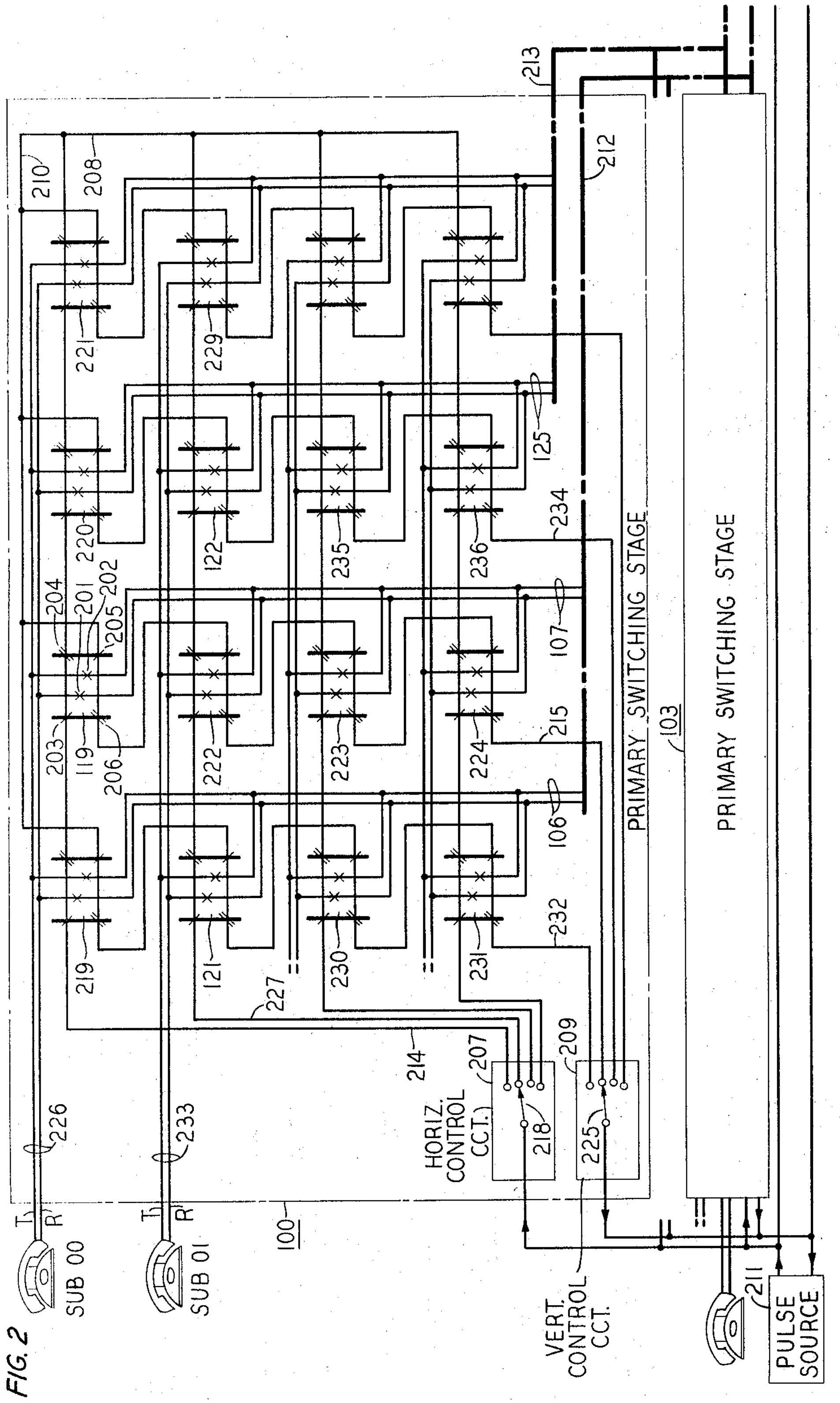
Figure 5:
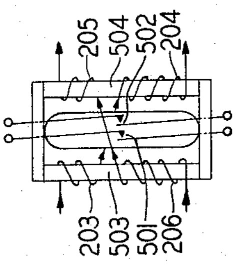
Figure 6:
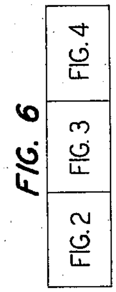

At this time a pulse from source 211 traverses the control path for ferreeds 313 and 123, described above, to operate ferreed 123. It will be noted that ferreed 313, previously operated to couple substation 01 to trunk 110, is now released in view of the current flow through only the vertical windings thereof, as explained above for FIG. 5. Ferreed 313, however, is operated in view of the current flow through all four windings thereof. Moreover, since the control circuits 207 and 209 of FIG. 2 remain quiescent, ferreeds 119 and 122 have current flow through neither the horizontal nor the vertical windings thereof and remains unaffected.

In consequence, at this time a path may be traced from substation 00, loop 226, contacts 201 and 202 of ferreed 119, conductor 107, cable 212 to FIG. 4 and condensers 406, 407, 404, 405 to the corresponding tip and ring conductors 124 extending to the second stage switch 104 and further over the contacts of ferreed 123, conductors 125, cable 213, conductors 125, contacts of ferreed 122 and loop 233 to substation 01.

A complete path now extends between the calling and called substations through the second stage network 104 and the supervisory circuit 401. At this time a signal is transmitted from the central office to operate relay 4CT, the cut-through relay as shown symbolically by the operation of switch 126. When relay 4CT is operated, the contacts thereof supply talking battery to both the calling and called switching paths.

Moreover, the path previously used for charging battery 129 over trunk 108, as described in the general description, is now interrupted at the contacts of relay 4CT. In addition, trunk 110, which was previously coupled to substation 01, is released at the contacts of ferreed 121 and the only trunk remaining connected between the office and the concentrator is trunk 108 which is utilized for supervision of the call.

Also as described above in the general description, relay 4S1 is operated over the path extending to the switchhook contacts of the calling party while supervisory relay 4S2 is operated over the path extending to the switchhook contacts of the called party.

Trunk 108 is now available for supervisory purposes exclusively and transmits hangup or disconnect indications at the substations. Thus, if the subscriber at substation 00 (the calling substation) disconnects first, relay 4S1 is released at the switchhook contacts (not shown) of substation 00 whereupon the contacts of relay 4S1 apply a ground condition through the contacts of relay 4CT to the ring conductor of trunk 108 extending to the central office which in turn may perform the appropriate functions in response thereto including the release of the trunk, if necessary, as described in the above-referred-to Jones and Ewin patents and the Fisher application.

Alternatively, if substation 01 disconnects first, relay 4S2 is released at the switchhook contacts of substation 01 and in turn applies a ground potential over the contacts of relay 4S2 and relay 4CT to the tip conductor of substation 108 and responsive equipment (not shown) at the central office which proceeds to perform the same disconnect functions.

It will be noted that although the extension of the connection to the calling substation 00 was illustratively made over trunk 108 and the first stage network 100, if traffic considerations so required, it would have been possible to have coupled substation 00 to trunk 108 through network 104 and network 100 over crosspoints 123 and 220.

Similarly, although in the illustrative example substation 01, the called substation, was initially connected to trunk 110 via second stage network 104 and first stage network 100, it might have been connected directly from the first stage network 100 to supervisory circuit 109 over crosspoint 121. Moreover, under these conditions, in order to convert from a conventional connection using both trunks 110 and 108 to the office to an intraconcentrator connection using only trunk 110, it is necessary merely to energize network 104 to release crosspoint 123 and to operate crosspoint 313 thereby coupling substation 00 to the supervisory circuit 109 and hence to substation 01.

It is to be understood that the above-described arrangements are illustrative of the application of the principles of the invention. Numerous other arrangements may be devised by those skilled in the art without departing from the spirit and scope of the invention.

What is claimed is:

1. A remote telephone line concentrator system including a telephone central office, a plurality of trunks extending from said office, a plurality of remote lines, remote switching means including first and second stage network means, means responsive to a calling condition on one of said lines for extending a connection to said line over a path including a first trunk and said first network means, means for extending a connection to a called line over a path including a second trunk and said first and second network means, and additional means for governing said second network means to simultaneously release said second trunk and interconnect said calling and called lines to said first trunk.

2. A remote telephone line concentrator system including a telephone central office, a plurality of trunks extending from said office, a plurality of remote telephone lines, remote switching means including first and second stage ferreed network means for coupling said lines to said trunks, means responsive to a calling condition on one of said lines for extending a connection to said line over a path including said first stage network means and a first trunk to said office, means for extending a connection to a called line over a path including said first and second stage network means and a second trunk, and additional means for releasing said second trunk and for coupling said calling and called lines to said first trunk to effect an intraconcentrator calling connection in response to a single control pulse delivered to said second stage network means.

3. A remote telephone line concentrator system comprising a telephone central office; a plurality of trunks extending from said office; a greater plurality of remote substation lines; remote switching means including first and second stage network means for coupling said lines to said trunks; supervisory circuit means at said remote switching means individual to said trunks; means responsive to a calling condition at one of said lines for extending a connection to said office over a path including said first stage network means, a first supervisory circuit means, and a first trunk; means for extending a connection to a called one of said lines over a path including said first stage network means, said second stage network means, a second supervisory circuit means and a second trunk; and intraconcentrator connecting means including means for connecting said calling and called lines to said first supervisory circuit means in response to a single control current pulse delivered to said second stage switching means.

4. A telephone line concentrator system including a telephone central office; a plurality of trunks extending from said office; a larger plurality of remote substation lines; remote switching means for coupling said substations to said trunks; said switching means including first and second stage ferreed network means; said network means having horizontal and vertical conductive paths and ferreed crosspoints at the intersections of said paths; means responsive to a calling condition on one of said lines for extending a connection to said office over a path including a selected crosspoint in said first network means and a first trunk; means for extending a connection to a called one of said lines over a path including a selected crosspoint in said first network means, a selected crosspoint in said second network means, and a second trunk to said office; and means for effecting an intraconcentrator connection between said calling and called lines including means for releasing said selected crosspoint in said second network means and for simultaneously operating another crosspoint in said second network means to couple said calling and called lines to said first trunk and simultaneously release said second trunk.

5. A telephone line concentrator system is accordance with claim 4 wherein ferreed crosspoints include horizontla and vertical differential windings thereon, and wherein said means for releasing includes control means for energizing said horizontal and vertical windings to effect the simultaneous release of said selected crosspoint in said second network means and operation of said another crosspoint in response to the transmission of a single pulse by said control means through said horizontal and vertical windings.

6. A telephone line concentrator switching system including a telephone central office, a plurality of trunks extending from said office, a greater plurality of remote substation lines, remote switching means for coupling said lines to said trunks, said switching means including first and second stage ferreed network means, said first and second stage network means including coordinate arrays having horizontal and vertical conductive paths, means for connecting said horizontal conductive paths of said first network means to said lines, means for connecting said horizontal conductive paths of said second network means to said trunks, means for connecting a portion of said vertical paths of said first network means to said vertical paths of said second network means, means for connecting the remaining vertical paths of said first network means to said trunks, means for extending a connection from a calling one of said lines to said office over a path including said first stage network means and a first trunk and exclusive of said second network means, means for extending a connection to a called one of said lines over a path including said first and second stage network means and a second trunk, and additional means for effecting an intraconcentrator connection between said calling and called lines including means for governing said second network means to simultaneously release said connection to said second trunk and to couple said called line to said trunk in response to the transmission of a single control current pulse to said second network means.

7. A remote telephone line concentrator system including a telephone central office; a plurality of remote substation lines; first and second stage ferreed network means having coordinate arrays of horizontal and vertical conductive paths with ferreed crosspoints at the intersections of said paths for coupling said lines to said trunks; supervisory circuit means individual to said trunks; said supervisory circuit means including first relay means and a second relay means; means for extending a connection from a calling one of said lines to said office over a path including a crosspoint in said first network means, a first supervisory circuit means and a first trunk; means for extending a connection to a called one of said lines over a path including a crosspoint in said first network means, a particular crosspoint in said second network means, a second supervisory circuit means and a second trunk; additional means for effecting an intraconcentrator calling connection including means for releasing said particular crosspoint in said second network means and for simultaneously operating a different crosspoint in said second network means to couple said called line to said first supervisory circuit means; and means including said first and second relay means for thereafter transmitting supervisory indications to said office over said first trunk in response to disconnect signals at said calling and called lines.

8. A remote telephone line concentrator system in accordance with claim 7 wherein said ferreed crosspoints in said first and second network means include horizontal and vertical windings hereon; and wherein said means for releasing includes pulse source means, control means for delivering a pulse of current from said pulse source means to said horizontal and vertical windings to simultaneously operate said different crosspoint in said second network means for coupling said called line to said first supervisory circuit means and to release said particular crosspoint in said second network means to disconnect said called line from said second supervisory means and said second trunk.

9. A remote telephone line concentrator system including a telephone central office, a plurality of remote substation lines; a smaller plurality of trunks extending from said office; remote switching means for coupling said lines to said trunks; said switching means including first and second stage network means; supervisory circuit means individual to said trunks; means for extending a connection to a calling one of said lines from said office over a path including said first and second network means, a first supervisory means, and a first trunk; means for extending a connection from said office to a called one of said lines over a path including said first network means, a second supervisory means, and a second trunk; and means for effecting an intraconcentrator calling connection between said calling and called lines including means for controlling said second network means to simultaneously extend a connection from said calling substation to said second trunk over said second supervisory circuit means and to release said first trunk in response to the reception by said second network means of a single control current pulse.

10. A telephone line concentrator switching system including a telephone central office; a plurality of remote substation lines; a smaller plurality of trunks extending from said office; first and second stage ferreed network switching means for coupling said lines to said trunks; said switching means including horizontal and vertical conductive paths and ferreed crosspoints at the intersections of said paths; said ferreed crosspoints having horizontal and vertical differential windings thereon and responsive to the transmission of a current pulse through all of said windings to operate said contacts and to the transmission of a current pulse through only a portion of said windings to release said contacts; control circuit means coupled to said horizontal and vertical windings for energizing selected crosspoint contacts; pulse source means coupled to said control circuit means; means for extending a connection to a calling one of said lines in response to the delivery of a control pulse from said pulse source means to said control circuit means including means to energize a selected crosspoint in said first network means for extending a connection to a first supervisory circuit means and a first trunk; means for extending a connection to a called one of said lines in response to the transmission of a pulse of current from said pulse source means to said control circuit means including means to energize another selected crosspoint in said first network means and a particular crosspoint in said second network means for extending a connection to a second supervisory circuit means and a second trunk to said office; intraconcentrator connecting means responsive to delivery of a pulse of current from said pulse source means to said control circuit means to simultaneously release said particular crosspoint in said second network means and to operate a different crosspoint in said second network means to extend a connection from said called substation to said first supervisory means and to release said second supervisory means and said second trunk; and additional means in said first supervisory means for thereafter transmitting disconnect indications from said calling and called substations over said first trunk.

References Cited by the Examiner

UNITED STATES PATENTS

| | | | |
|---|---|---|---|
| 3,037,085 | 5/1962 | Lowry | 179—22 X |
| 3,198,887 | 8/1965 | Brooks et al. | 179—18.3 |
| 3,234,335 | 2/1966 | Keister | 179—18.7 |
| 3,250,859 | 5/1966 | Fisher | 179—18.3 |

KATHLEEN H. CLAFFY, *Primary Examiner.*

L. A. WRIGHT, *Assistant Examiner.*